United States Patent
Nakai

(10) Patent No.: US 6,330,110 B2
(45) Date of Patent: Dec. 11, 2001

(54) DIFFRACTIVE OPTICAL ELEMENT AND OPTICAL SYSTEM HAVING THE SAME

(75) Inventor: Takehiko Nakai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/840,232

(22) Filed: Apr. 24, 2001

Related U.S. Application Data

(62) Division of application No. 09/121,683, filed on Jul. 24, 1998.

(30) Foreign Application Priority Data

Jul. 28, 1997 (JP) .................................................. 9-217104

(51) Int. Cl.$^7$ .................................................. G02B 5/18
(52) U.S. Cl. .......................................... 359/576; 359/566
(58) Field of Search .................................. 359/576, 566, 359/571, 569, 575

(56) References Cited

U.S. PATENT DOCUMENTS

| 5,044,706 | 9/1991 | Chen ..................... | 359/357 |
|---|---|---|---|
| 5,048,925 | 9/1991 | Gerritsen et al. ............ | 359/569 |
| 5,737,113 | 4/1998 | Kuramochi et al. .......... | 359/259 |
| 5,737,125 | 4/1998 | Ohashi ..................... | 359/565 |
| 5,847,877 | * 12/1998 | Imamura et al. ............ | 359/566 |
| 5,995,291 | 11/1999 | Togino .................... | 359/631 |
| 6,011,651 | 1/2000 | Kamo .................... | 359/575 |
| 6,122,104 | 9/2000 | Nakai .................... | 359/576 |

FOREIGN PATENT DOCUMENTS

| 195 33 591 | 3/1996 | (DE) . |
|---|---|---|
| 0 534 711 | 3/1993 | (EP) . |
| 4-213421 | 8/1992 | (JP) . |
| 6-324262 | 11/1994 | (JP) . |
| 9-127321 | 5/1997 | (JP) . |
| 9-127322 | 5/1997 | (JP) . |

OTHER PUBLICATIONS

Patent Abstracts of Japan, vol. 1997, No. 09 (JP 9–127322, May 16, 1997), Sep. 30, 1997.

M.W. Farn, et al., "Diffractive Doublet Corrected On–Axis at Two Wavelengths," Proceedings of the SPIE: International Lens Design Conference, vol. 1354 (Jun. 11–14, 1990), pp. 24–29.

C. Londoño, et al., "The Design of Achromatized Hybrid Diffractive Lens Systems," Proceedings of the SPIE: International Lens Design Conference, vol. 1354 (Jun. 11–14, 1990), pp. 30–37.

* cited by examiner

Primary Examiner—Darren Schuberg
Assistant Examiner—Fayez Assaf
(74) Attorney, Agent, or Firm—Fitzpatrick, Cella, Harper & Scinto

(57) ABSTRACT

In a diffractive optical element composed of three or more laminated layers and having a diffraction grating at each interface between adjacent layers, each even-number-th layer has a uniform thickness.

12 Claims, 9 Drawing Sheets

F I G. 6(A)
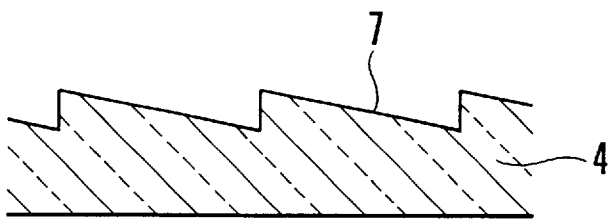
F I G. 6(B)
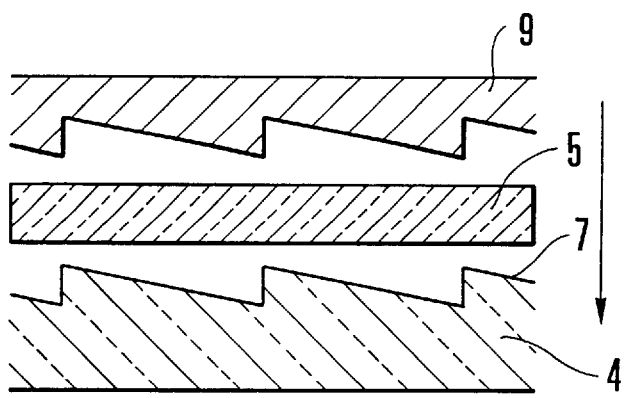
F I G. 6(C)
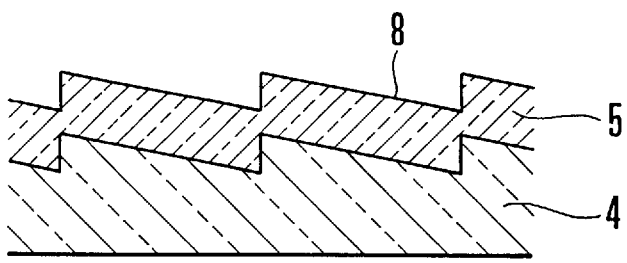
F I G. 6(D)
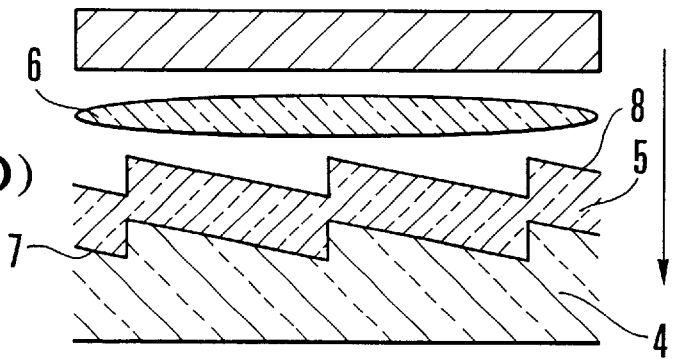
F I G. 6(E)
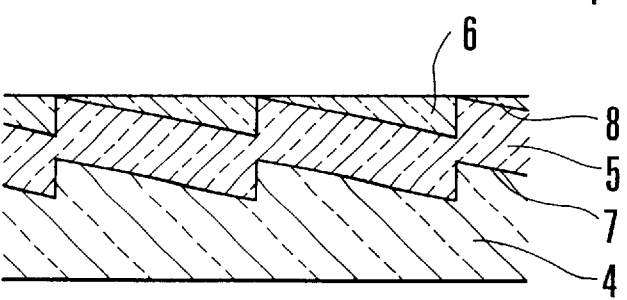

DIFFRACTIVE OPTICAL ELEMENT AND OPTICAL SYSTEM HAVING THE SAME

This application is a division of Application Ser. No. 09/121,683 filed Jul. 24, 1998.

BACKGROUND OF THE INVENTION

1. Field of the Invention

The present invention relates to diffractive optical elements, and more particularly to a diffractive optical element having such a grating structure that rays of a plurality of wavelengths or rays of a specific wavelength band concentrate at a specific order (a design order) of diffraction, and to an optical system having the diffractive optical element.

2. Description of Related Art

Heretofore, as one of methods of correcting chromatic aberration of an optical system, there is known a method of combining two glass (lens) materials which differ in dispersion.

In contrast to the method of reducing chromatic aberration by combining glass materials, there is known another method, which is disclosed in the optical literature, such as "International Lens Design Conference (1990)", SPIE Vol. 1354, etc., and the specifications of Japanese Laid-Open Patent Applications No. HEI 4-213421 and No. HEI 6-324262 and U.S. Pat. No. 5,044,706. In the case of that method, chromatic aberration is corrected by means of a diffractive optical element which is provided with a diffraction grating for a diffracting action and is disposed on a lens surface or a part of an optical system. That method is based on a physical phenomenon that the direction in which chromatic aberration arises for a ray of light of a reference wavelength becomes opposite between a refractive surface and a diffractive surface in an optical system.

Further, the diffractive optical element of such a type can be arranged to produce an advantageous correcting effect, like an aspheric lens, on the aberration by varying the period of a periodic structure of its diffraction grating.

Here, compared with a refracting action of rays of light, while one ray of light remains one even after refraction at a lens surface, one ray of light is split into rays of a plurality of orders after diffraction at a diffractive surface.

Therefore, in using a diffractive optical element for a lens system, it is necessary to decide the grating structure in such a way as to cause a light flux of a useful wavelength region to concentrate at a specific order (design order) of diffraction. With the light flux concentrating at the specific order, rays of diffraction light other than the light flux of the specific order have a low degree of intensity. When the intensity becomes zero, the rays of diffraction light would not exist.

In order to attain the above-stated feature, the diffraction efficiency of a ray of light of the design order must be sufficiently high. Further, in a case where there are some rays of light having diffraction orders other than the design order, these rays are imaged in a place different from the imaging place of the ray of light of the design order, and thus appear as flare light.

For an optical system using a diffractive optical element, therefore, it is important to pay sufficient heed to the spectral distribution of diffraction efficiency at the design order and the behavior of rays of diffraction light of orders other than the design order.

FIG. 11 shows a case where a diffractive optical element 1, which has a diffraction grating 3 and is composed of one layer on a base plate 2, is formed on a surface of an optical system. In this case, diffraction efficiency for a specific order of diffraction is obtained as shown in FIG. 12, which shows the characteristic of the diffraction efficiency. In FIG. 12, the abscissa axis of a graph indicates wavelength (nm) and the ordinate axis indicates the diffraction efficiency (%)

The diffractive optical element 1 is designed to have the diffraction efficiency become highest at the first order of diffraction (shown in a full line curve in FIG. 12) in the useful wavelength region. In other words, the design order of the diffractive optical element 1 is the first order.

Further, FIG. 12 shows also the diffraction efficiency of a diffraction order near the design order, i.e., zero-order light and second-order light (1±1 order).

As shown in FIG. 12, at the design order, the diffraction efficiency becomes highest at a certain wavelength (540 nm) (hereinafter referred to as a "design wavelength") and gradually decreases at other wavelengths. The lower portion of the diffraction efficiency obtained at the design order becomes diffraction light of other orders and comes to appear as flare light. Further, in a case where the diffractive optical element is provided with a plurality of diffraction gratings, a drop in diffraction efficiency at wavelengths other than the design wavelength eventually causes a decrease in transmission factor.

Diffractive optical elements having the structure capable of lessening the drop in diffraction efficiency are disclosed in Japanese Laid-Open Patent Applications No. HEI 9-127321, No. HEI 9-127322, etc. According to the structural arrangement disclosed in Japanese Laid-Open Patent Application No. HEI 9-127321, the diffractive optical element is formed by laminating two layers 4 and 17 as shown in FIG. 13 which is a sectional view.

On the other hand, according to the structural arrangement disclosed in Japanese Laid-Open Patent Application No. HEI 9-127322, the diffractive optical element has such a grating structure that three layers 4, 17 and 6 are laminated as shown in FIG. 14. The thickness of the layer 17 which is interposed in between diffraction grating surfaces 7 and 8 each of which is formed at a boundary face between two layers is not uniform. Thus, the diffractive optical element has the diffraction grating surfaces 7 and 8 which are formed at boundary faces between different materials. A high diffraction efficiency is attained by optimizing a difference in refractive index between the materials of layers disposed across each boundary and the depth of grating grooves formed in these layers.

In the above-stated diffractive optical element having a grating structure composed of a plurality of laminated layers, it is necessary to make at a desired value a wavelength characteristic of a difference in refractive index between the layer materials disposed across (in front and in rear of) a diffraction grating surface. For example, in the arrangement disclosed in Japanese Laid-Open Patent Application No. HEI 9-127321, one of the layers disposed across the diffraction grating surface must be made of a material which is of a high refractive index and a low dispersion while the other layer must be made of a material which is of a low refractive index and a high dispersion. Use of materials for these layers is thus limited to this combination of different materials.

Further, in the case of the arrangement disclosed in Japanese Laid-Open Patent Application No. HEI 9-127322, the kinds of layer materials are increased to three kinds. The number of kinds of selectable materials can be increased by varying the depth of grating grooves of the diffraction grating surfaces 7 and 8. The selectable layer materials are, however, inevitably limited as long as the wavelength characteristic of a difference in refractive index between these layer materials is used in arranging the diffractive optical element.

On the other hand, the materials usable across a boundary between layers are limited, from a manufacturing viewpoint, to such materials that have good adherence to each other, nearly the same coefficients of thermal expansion, and so on. It is also necessary that these materials must excel in workability for forming diffraction gratings.

The usable materials are thus limited not only in respect of optical characteristics but also from the manufacturing viewpoint. Therefore, it is not easy to find such optical materials that satisfy all of these conditions.

BRIEF SUMMARY OF THE INVENTION

It is an object of the invention to provide a diffractive optical element, or an optical system having the diffractive optical element, which is arranged to make selection of materials of layers relatively easy, to give a high diffraction efficiency and to effectively suppress flare light, etc.

To attain the above object, in accordance with an aspect of the invention, there is provided a diffractive optical element composed of three or more laminated layers and having a diffraction grating at each interface between adjacent layers, in which each even-number-th layer has a uniform thickness.

In accordance with another aspect of the invention, there is provided a diffractive optical element composed of a plurality of layers made of at least two kinds of materials of different dispersions (Abbe Number vd) to enhance diffraction efficiency of a specific order over an entire useful wavelength region, in which, where the plurality of layers are counted in order as an i-th layer, a first diffraction grating surface is formed at a boundary between the first layer and the second layer, a second diffraction grating surface is formed at a boundary between the second layer and the third layer and an L-th diffraction grating surface is formed at a boundary between the L-th layer and the (L+1)-th layer, and each even-number-th layer is a uniform-thickness layer having a uniform thickness over an entire area thereof.

In accordance with one mode of the diffractive optical element according to the invention, the thickness of the uniform-thickness layer is greater than the depth of a grating groove of a diffraction grating surface formed at a boundary between the uniform-thickness layer and an adjacent layer.

In accordance with one mode of the diffractive optical element according to the invention, the uniform-thickness layer has such a thickness as to give a reflection preventing characteristic.

In accordance with one mode of the diffractive optical element according to the invention, the uniform-thickness layer is made of a plastic optical material or an ultraviolet curable resin.

In accordance with one mode of the diffractive optical element according to the invention, the useful wavelength region is a visible spectrum.

In accordance with one mode of the diffractive optical element according to the invention, the first layer is formed on a base plate, and the first layer and the base plate are made of the same material.

In accordance with a further aspect of the invention, there is provided an optical system having the above diffractive optical element, which is, for example, an image forming optical system or an observation optical system.

In accordance with a further aspect of the invention, there is provided an optical apparatus or an electronic apparatus having the above optical system.

These and other objects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 6(A) to 6(E) are sectional views for explaining another method of manufacturing the diffractive optical element according to the first embodiment of the invention.

DETAILED DESCRIPTION OF THE INVENTION

Hereinafter, preferred embodiments of the invention will be described in detail with reference to the drawings.

Figure 1:
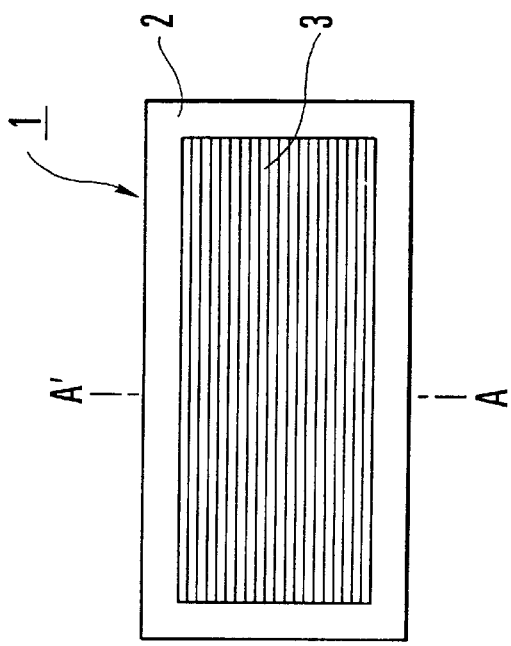
FIG. 1 is a front view showing essential parts of a diffractive optical element according to a first embodiment of the invention.
Figure 2:
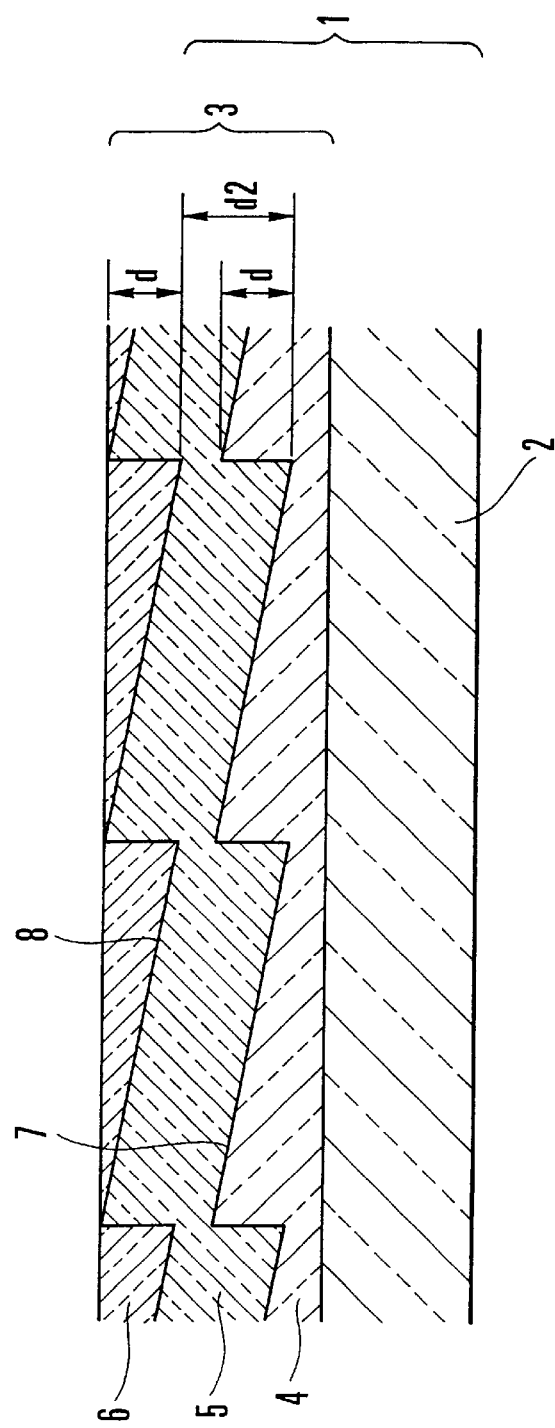
FIG. 2 is a sectional view showing essential parts of the diffractive optical element according to the first embodiment of the invention.

FIG. 1 is a front view showing a diffractive optical element according to a first embodiment of the invention. Referring to FIG. 1, the diffractive optical element 1 is composed of a multi-layer part 3 formed by laminating a plurality of layers on the surface of a base plate 2. FIG. 2 is a sectional view of the diffractive optical element taken along a line A–A' of FIG. 1. In FIG. 2, the diffractive optical element is illustrated in a shape exaggerated in the direction of the depth of grating surfaces (diffraction grating surfaces) 7 and 8.

The sectional grating shape of the diffractive optical element 1 in the first embodiment is composed of three layers, i.e., the first layer 4, the second layer 5 and the third layer 6. A first diffraction grating surface 7 is formed at a boundary part between the first layer 4 and the second layer 5. A second diffraction grating surface 8 is formed at a boundary part between the second layer 5 and the third layer 6. The second layer 5 which is in contact with the two diffraction grating surfaces 7 and 8 is made to be a uniform-thickness layer having a uniform thickness in the propagating direction of light over the entire area of the diffractive optical element 1.

Further, since the first and second diffraction grating surfaces 7 and 8 are formed through the uniform-thickness layer 5, the grating shape of the first diffraction grating surface 7 is exactly the same as that of the second diffraction grating surface 8. A feature of the first embodiment lies in that the first and second diffraction grating surfaces 7 and 8 act as one diffractive optical element 1 throughout all the layers thereof.

Here, a layer which has a diffraction grating surface on one side thereof and a thickness of the material of which periodically varies, as each of the layers 4 and 6, will be called a diffraction grating.

As described above, a diffractive optical element according to the first embodiment of the invention has a grating structure formed by laminating on a base plate a plurality of layers made of at least two kinds of materials of different dispersions. With a boundary between the first layer and the second layer, counting in sequence from the base plate, assumed to be a first diffraction grating surface, a boundary between the second layer and the third layer assumed to be a second diffraction grating surface and a boundary between the L-th layer and the (L+1)-th layer assumed to be an L-th diffraction grating surface, each of the even-number-th layers has a uniform thickness over the whole area thereof, and the diffraction gratings are joined together through each uniform-thickness layer.

Meanwhile, a structural arrangement similar to the shape of the diffractive optical element according to the invention was disclosed in Japanese Laid-Open Patent Application No. HEI 9-127321. However, the diffractive optical element disclosed in Japanese Laid-Open Patent Application No. HEI 9-127321 uses a plurality of diffraction gratings for the purpose of allocating individual diffractive powers to them. For this purpose, each diffraction grating is arranged to independently have its diffraction characteristic. In the case of the first embodiment of the invention, on the other hand, the two diffraction gratings 4 and 6 are arranged to act integrally as one diffraction grating. The diffraction grating according to the invention thus completely differs from the prior arrangement in size and material of the layer.

Figure 14:
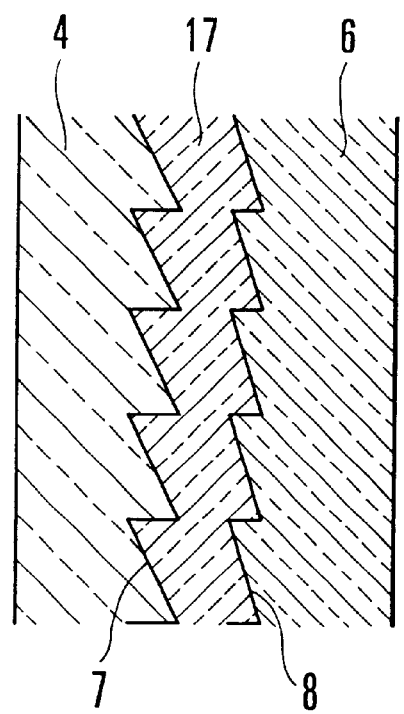
FIG. 14 shows in a sectional view another grating shape of the conventional diffractive optical element.

Further, the object of the prior arrangement cited above cannot be attained by arranging the diffraction gratings in the same direction as the embodiment of the invention. In actuality, therefore, the diffraction gratings of the prior arrangement must be shaped to differ in direction from the shape shown in FIG. 14. The diffractive optical element of the prior arrangement cited above thus completely differs from the diffractive optical element of the invention also in this point.

Next, the diffraction efficiency of the diffractive optical element according to the first embodiment of the invention is described as follows.

Figure 11:
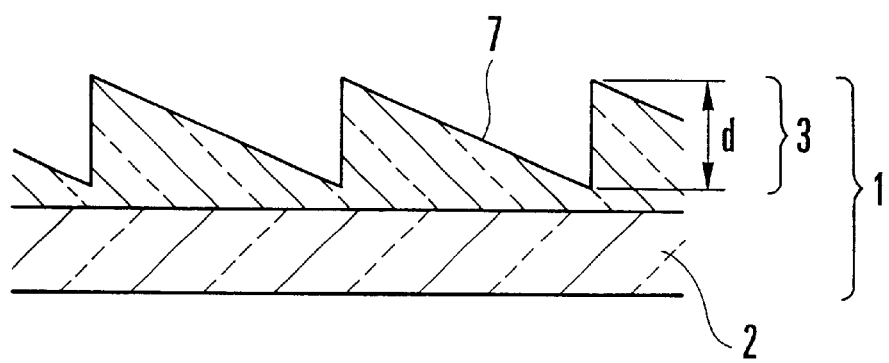
FIG. 11 is a sectional view showing essential parts of the conventional diffractive optical element.
Figure 12:
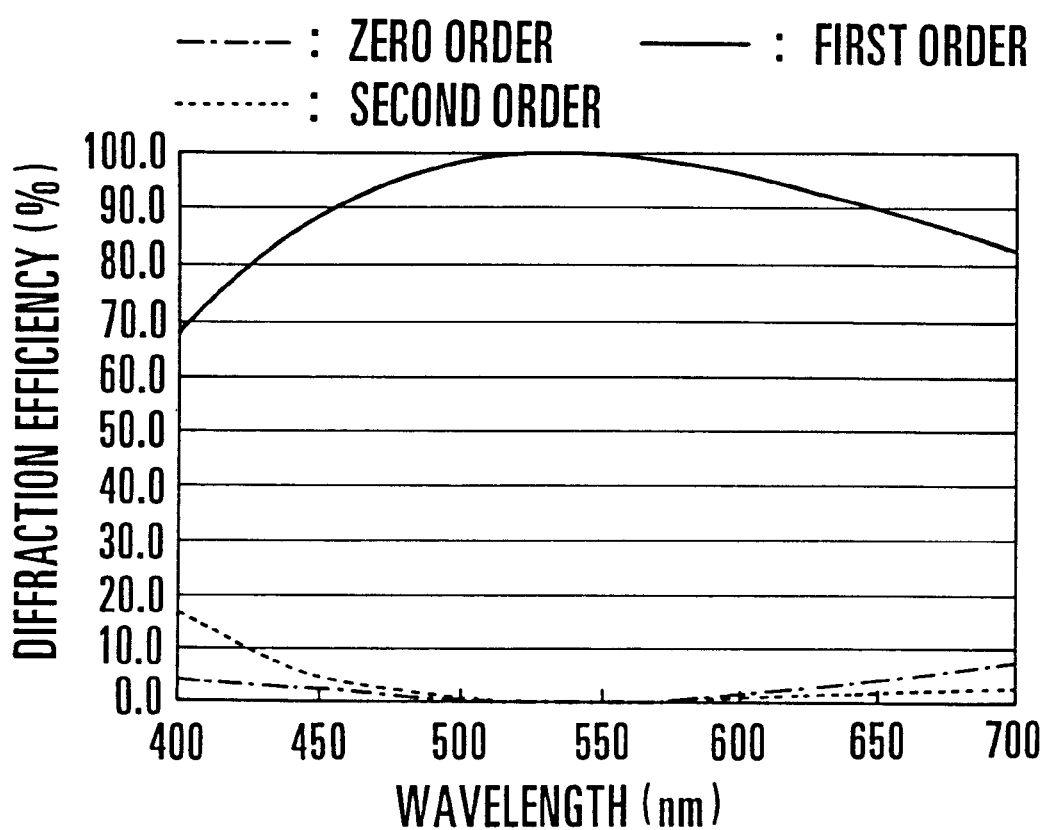
FIG. 12 is a graph showing the diffraction efficiency of the conventional diffractive optical element.
Figure 13:
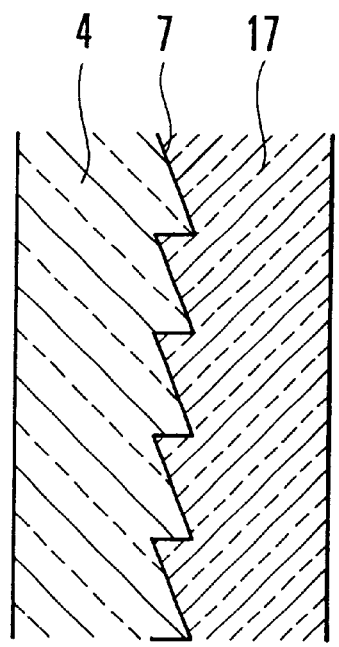
FIG. 13 shows in a sectional view the grating shape of the conventional diffractive optical element.

FIG. 11 shows a transmission-type diffraction grating 3 of an ordinary single-layer structure, which is to be used in air.

In order to obtain a maximum diffraction efficiency for a design wavelength $\lambda 0$ by the diffraction grating of such a type, the optical path length difference d0 between the crest and the trough of a diffraction grating surface 7 is required to be integer times as much as the design wavelength, as expressed below, for a light flux which is perpendicularly incident on the diffraction grating:

$$d0=(n0-1)d=m\lambda 0 \quad (1)$$

where n0 is a refractive index of the material of the diffraction grating 3 at the wave length $\lambda 0$, d is a grating thickness of the diffraction grating 3, and m is a design order of diffraction.

The basic concept of the diffractive optical element composed of two or more diffraction gratings, i.e., two or more layers, is the same as that of the above-stated single-layer type diffraction grating. In order to have all the layers act as one diffraction grating, the multi-layer diffractive optical element is arranged as follows. The optical path length difference between the crest and the trough of the diffraction grating formed at each boundary between two layers is obtained, and the difference values thus obtained for all of the layers are added together to obtain a total sum. Then, the diffractive optical element is made to have the total sum become integer times as large as the design wavelength.

Therefore, a conditional expression for the first embodiment shown in FIG. 2 becomes as follows:

$$(n01-n02)d-(n03-n02)d=m\lambda 0 \quad (2)$$

where n01 is a refractive index of the material of the first layer 4 at the wavelength $\lambda 0$, n02 is a refractive index of the material of the second layer 5 at the wavelength $\lambda 0$, and n03 is a refractive index of the material of the third layer 6 at the wavelength $\lambda 0$. In the case of a diffractive optical element disclosed in Japanese Laid-Open Patent Application No. HEI 9-127322, the diffraction gratings 4 and 6 are arranged to differ in grating thickness from each other in the formula (2).

The first embodiment of the invention is characterized in that the two confronting gratings are arranged to be in shapes which are equal to each other. With the first embodiment arranged in this manner, the formula (2) becomes as follows:

$$(n01-n03)d=m\lambda 0 \quad (3)$$

Then, with the diffraction efficiency assumed to be $\eta$, a phase error assumed to be $\phi 0$, being expressed as $\phi 0=(n01-n03)d-m\lambda 0$, the diffraction efficiency $\eta$ can be expressed as follows:

$$\eta=\sin c^2[(n01-n03)d/m\lambda 0-1]=\sin c^2(\phi 0/m\lambda 0) \quad (4)$$

where sin c(x) is a function which can be expressed as sin c(x)=sin($\Pi$x)/$\Pi$x.

Therefore, if the formula (3) is satisfied for the whole useful wavelength region, the phase error $\phi 0$ becomes "0" in the formula (4), so that the diffraction efficiency becomes maximum over the whole region of useful wavelengths, according to $\eta=\sin c^2[0]=1$.

Here, the refractive index of the second layer 5 is not included in the formula (4). This means that the material of the second layer 5 has no influence on the diffraction efficiency. Therefore, the material of the second layer 5 can be selected from among materials having any values of both the refractive index and dispersion.

According to the above feature of the invention, the materials of the first and third layers 4 and 6 are selected from among such materials that have required optical characteristics, and the material of the second layer 5 is selected from among such materials that are complementary to the shortcomings of the materials of the first and third layers with respect to joining them directly with each other and can be readily joined to both of the first and third layer materials.

The materials of these layers are selected as described below.

A case where glass is to be used for the first and third layers is first described as follows. In this case, a combination of glass materials that satisfies the condition for diffraction efficiency can be selected from among combinations equivalent to a combination of the materials of a two-layer type diffractive optical element disclosed in Japanese Laid-Open Patent Application No. HEI 9-127321.

Figure 3:
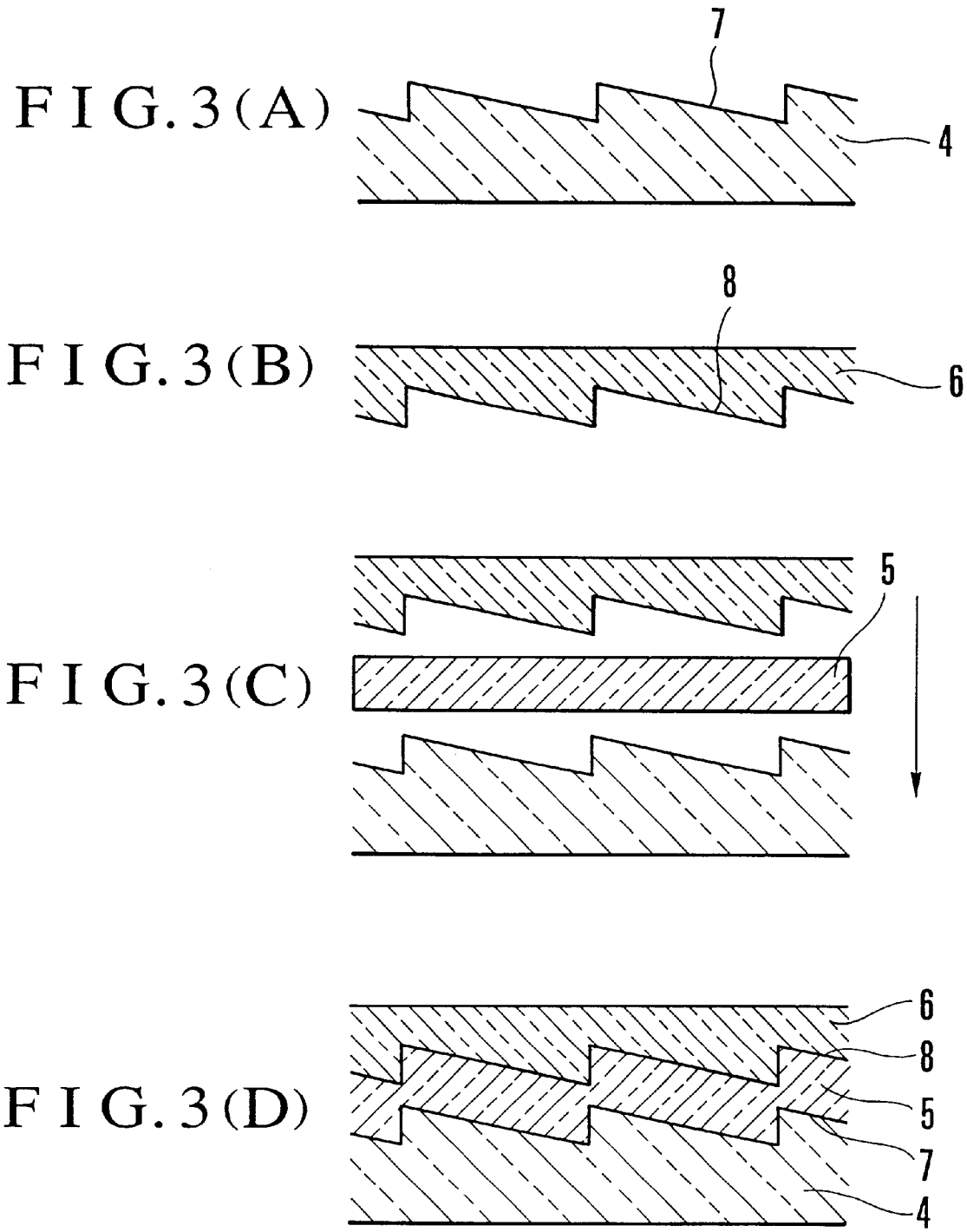
FIGS. 3(A) to 3(D) are sectional views for explaining a method of manufacturing the diffractive optical element according to the first embodiment of the invention.

Meanwhile, in respect of manufacturing processes, a method for the manufacture as shown in FIGS. 3(A) to 3(D) is conceivable. The diffraction grating surface 7 is first formed by molding or the like on the glass surface of the first layer 4 to obtain the diffraction grating 4, as shown in FIG. 3(A). In this case, the base plate 2 and the first layer 4 are formed with the same material.

Then, the diffraction grating is formed with the third layer 6 in the same manner as in the first layer 4, as shown in FIG. 3(B).

Figure 15A:
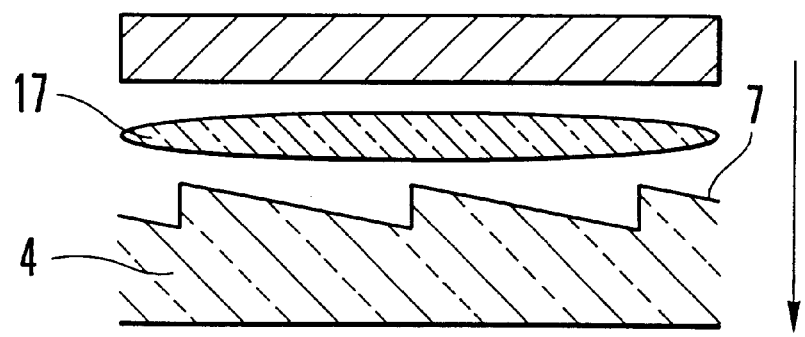
FIGS. 15(A) and 15(B) are sectional views for explaining a method of manufacturing the conventional diffractive optical element.
Figure 15B:
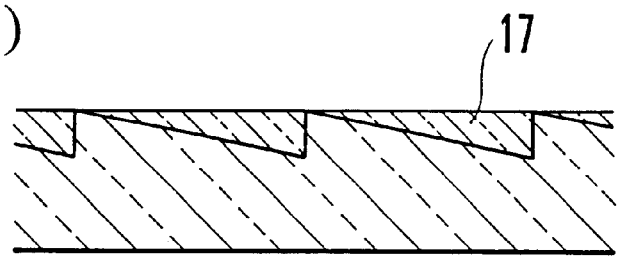

Next, the first and third layers 4 and 6 are joined together through the second layer 5, which is a uniform-thickness layer, as shown in FIG. 3(C). By the above process the final shape of the diffractive optical element is obtained as shown in FIG. 3(D). In the case of joining glass materials together, as shown in FIGS. 15(A) and 15(B), it has been practiced to pour a second glass material 17 of the second layer into the first diffraction grating 4 of the first layer after the diffraction grating 4 is molded with a mold, as shown in FIG. 15(A), and then to obtain a two-layer diffractive optical element by cooling the second layer, as shown in FIG. 15(B).

In the case of this conventional method, it has been a necessary condition to use an optical glass material of a high fusing point for the first layer 4 and a glass material of a low fusing point for the second layer 17. Therefore, even if there is such a combination of optical glass materials that gives a high diffraction efficiency in respect of optical characteristic, the adoption of such advantageous combination has been sometimes prevented by this manufacturing condition.

To solve this problem, the first embodiment of the invention is arranged to permit use of either an ultraviolet curable resin or some other material that has a large difference in fusing point from glass, as the material of the uniform-thickness layer. The use of such a material permits two glass materials to be joined together. This method was disclosed also in Japanese Laid-Open Patent Application No. HEI 9-127322.

The first embodiment is characterized by the provision of the uniform-thickness layer which permits a search for such optical materials that give an adequate diffraction efficiency in respect to the first and third layers and a search in respect to the second layer for a material having such a property that is necessary for the manufacture. These searches for materials can be made independently of each other. The provision of the uniform-thickness layer facilitates the manufacture of a diffractive optical element with a combination of optical glass of two different kinds, which has been difficult because glass materials cannot be easily joined together. A diffractive optical element having a high degree of diffraction efficiency thus can be easily manufactured according to the arrangement of the first embodiment.

Next, a case where glass is used for the first layer and a plastic material for the third layer is described as follows. In this case, a material which has an intermediate thermal expansion characteristic between glass and plastic materials is used for the second layer to join the first and third layers through the second layer. The use of such a material effectively solves a problem that, with glass and plastic materials directly joined together, their boundary faces peel off from each other or fine cracks are produced due to their expansion or contraction caused by heat.

Further, according to the above-stated manufacturing method, the first diffraction grating 4 and the second diffraction grating 6 are in projected and recessed grating surface shapes which are perfectly conversed. Therefore, the projected and recessed molds can be easily reproduced by stamping with one mold used as an original. With the above-stated manufacturing method employed, even in the event of some manufacturing error, the grating surface shape of the first diffraction grating 4 and that of the second diffraction grating 6 become identical with each other in inverted shapes in projection and recession.

This feature of the diffraction grating manufacturing method is hereinafter described in comparison with the arrangement of Japanese Laid-Open Patent Application No. HEI 9-127322 in which the second layer has a varying thickness.

Some deviation from a design value in grating thickness is considered to be inevitable. In the structural arrangement of the invention, an optical glass material, BSM81 (nd=1.6400, vd=60.1), which is a product of OHARA Co., is used for the first layer, an ultraviolet curable resin, C001 (nd=1.5250, vd=50.8), which is a product of DAI-NIPPON Ink, Co., is used for the second layer, and a plastic material PC (nd=1.5831, vd=30.2) is used for the third layer.

Figure 4:
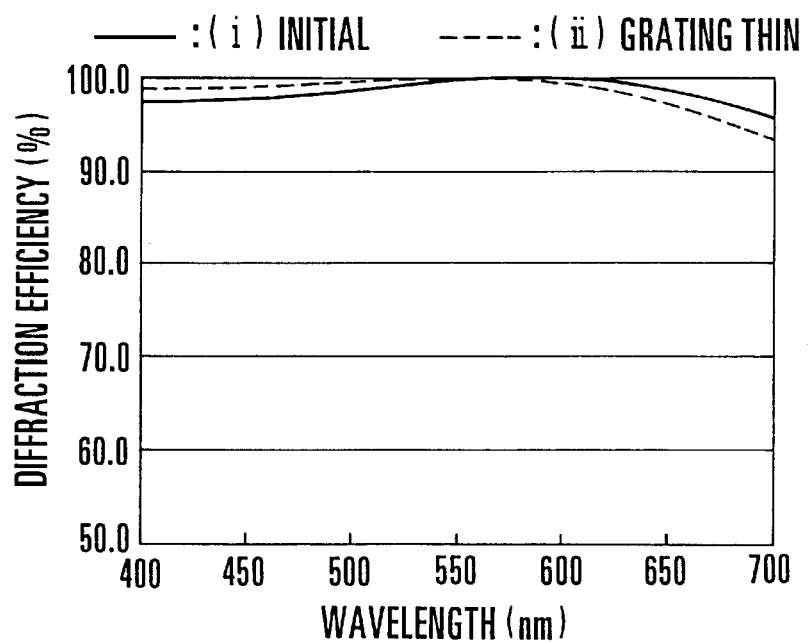
FIG. 4 is a graph showing the diffraction efficiency of the diffractive optical element according to the first embodiment of the invention.

In this structural arrangement, the grating thickness of each of the diffraction gratings 4 and 6 formed at each boundary is 10.3 $\mu$m. In this instance, a manufacturing error of grating thickness is assumed to be 3%. FIG. 4 shows in a graph the diffraction efficiency in each of these occurrences. In FIG. 4, a curve (i) indicates the diffraction efficiency obtained at the design value of grating thickness, and a curve (ii) indicates the diffraction efficiency obtained with the diffraction gratings manufactured to have a thickness thinner by 3% than the design thickness.

According to this manufacturing method, both the first and second diffraction gratings 4 and 6 are manufactured at a thinner thickness value of 10 $\mu$m. The uniform thickness of the uniform-thickness layer which is a feature of the invention, therefore, can be maintained. As apparent from the illustration, the diffraction efficiency changes only by 2% or thereabout even with the diffractive optical element manufactured with the error of 3% or thereabout by the above-stated manufacturing method. Therefore, the diffractive optical element can be easily manufactured by the above-stated method.

Next, as a case where different grating thicknesses are employed, the diffractive optical element is considered to have such a construction that the first layer is made of a plastic material PMMA (nd=1.4917, vd=57.4), the second layer is made of the plastic material PC (nd=1.5831, vd=30.2), the third layer is air, the grating thickness of the first diffraction grating 4 is 15.16 $\mu$m, and the grating thickness of the second diffraction grating 6 is 3.34 $\mu$m. The manufacturing error occurring in grating thickness is also assumed to be 3%.

Figure 5:
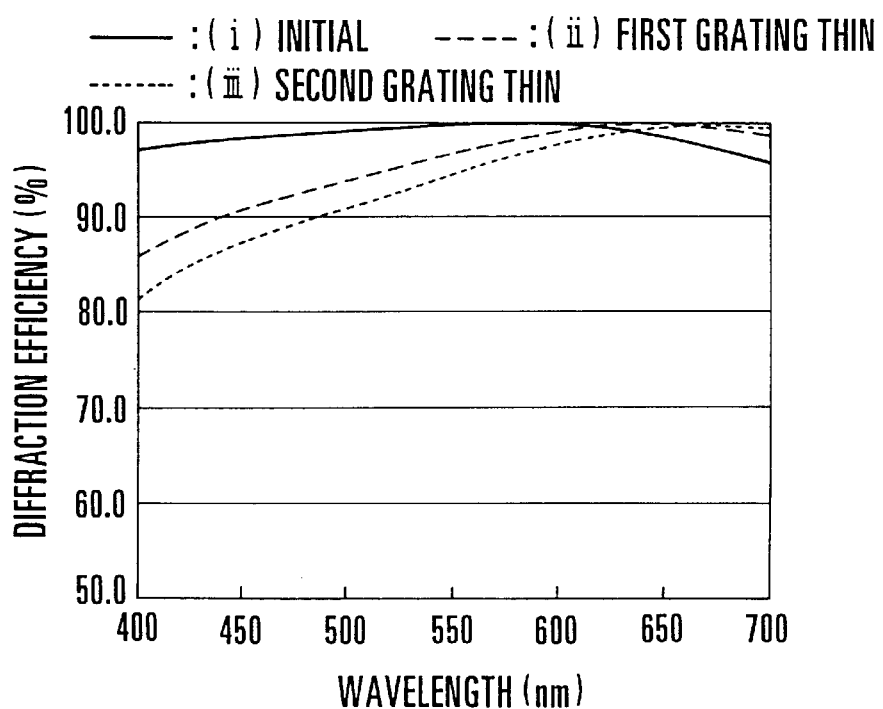
FIG. 5 is a graph showing the diffraction efficiency of the conventional diffractive optical element.

FIG. 5 is a graph showing the diffraction efficiency obtained in this construction.

In FIG. 5, a curve (i) shows the diffraction efficiency obtained with the diffractive optical element manufactured at the design values of grating thickness. A curve (ii) shows the diffraction efficiency obtained with the first diffraction grating 4 manufactured to have its grating thickness thinner by 3% than the design value. A curve (iii) shows the diffraction efficiency obtained with the second diffraction grating 6 manufactured to have its grating thickness thinner by 3% than the design value.

Both the curves (ii) and (iii) of FIG. 5 show that the diffraction efficiency drops by 10 to 15% or thereabout. In the case of the curve (iii), since the grating thickness is thin, the error in thickness is only 0.1 µm. Despite of such a slight change, the diffraction efficiency greatly varies. This clearly indicates that the structural arrangement requires a considerably high degree of precision for the manufacture.

As apparent from the comparison made above, the arrangement of the first embodiment for forming the diffraction gratings at equal grating thickness makes the manufacture of the diffractive optical element easier than in the case of the arrangement in which diffraction gratings are formed to have different thicknesses.

FIGS. 6(A) to 6(E) show another manufacturing method by which the above-stated advantageous feature can be also attained. In the case of this method, a diffraction grating which is made of the glass material of the first layer 4 is formed by molding with a mold, as shown in FIG. 6(A). Then, by using the same mold 9 used for the first layer 4, as shown in FIG. 6(B), the second layer 5 is formed to have a uniform thickness as shown in FIG. 6(C).

Next, the third layer 6 is molded over the uniform-thickness layer 5, as shown in FIG. 6(D), to obtain a final shape as shown in FIG. 6(E). This method is preferable, because it permits forming both the diffraction grating surfaces 7 and 8 with one and the same mold.

In the structural arrangement described above, the optical characteristic of the second layer does not contribute to the diffraction efficiency. Therefore, no limitation is imposed on the optical characteristic of the second layer. However, the diffraction efficiency can be enhanced further by using, for the second layer, a material having a high transmission factor within the useful wavelength region.

The thickness of the second, uniform-thickness layer can be set as desired as it does not contribute to the diffraction efficiency. However, an excessive thickness would make it hardly possible to consider a plurality of laminated diffraction gratings as a single diffractive optical element. Therefore, the thickness is preferably set to such a value that enables the diffractive optical element to have a thin composite grating thickness composed of a plurality of layers.

Figure 7:
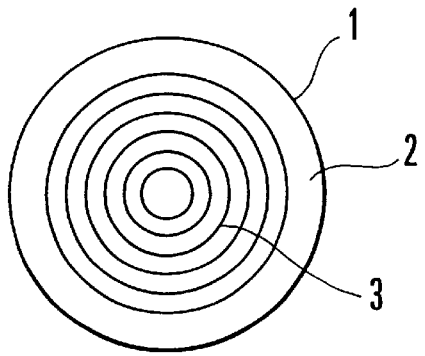
FIG. 7 shows a modification in shape of the diffractive optical element according to the first embodiment of the invention.

The diffraction grating shape has been described by limiting it to a shape obtained within one period of diffraction grating. However, the diffraction efficiency is basically not affected by the pitch of the diffraction grating. In other words, the arrangement of the first embodiment described above is applicable not only to the one-dimensional diffraction grating shown in FIG. 1 but also to all diffractive optical elements having different grating pitches and/or grating shapes, including a diffractive lens shown in FIG. 7.

Further, in the case of the first embodiment, the invention is applied to the diffractive optical element formed by arranging a plurality of diffraction gratings on the base plate 2. However, the advantageous effects are also attainable by arranging diffraction gratings on a curved lens surface instead of a flat surface.

In the description of the first embodiment given above, the design order of diffraction is assumed to be the first order. However, the order of diffraction is not limited to the first order. The same advantageous effect of the invention can be attained for light of other diffraction orders, such as light of the second diffraction order, by designing a composite optical path length difference in such a way as to obtain a desired (design) wavelength at a desired diffraction order.

Next, a diffractive optical element according to a second embodiment of the invention is described. In the first embodiment, the thickness of the second layer is not specified in particular. However, with no uniform-thickness layer used, a part of a light flux would come to reflect if a difference in refractive index between layer materials is large at a boundary between them. In such a case, the boundary face would act like a reflection-type diffraction grating to generate light of unnecessary diffraction orders, thereby causing flare light.

Therefore, in the second embodiment, the uniform-thickness layer is arranged to have such a thickness that effectively prevents light from reflecting at the boundary face between different layer materials. The diffraction efficiency of the diffractive optical element thus can be attained at the design order of diffraction with no light reflected at unnecessary diffraction orders.

More specifically, with a refractive index of the material of the second layer at the wavelength λ0 assumed to be n02 and the thickness of the second layer be assumed to be d2, the second layer satisfies the following relation:

$$n02 \times d2 = m \times (\lambda 0/4),$$

where m is an integer.

In the second embodiment, two diffraction gratings are formed through a uniform-thickness layer. The number of diffraction gratings is, however, not limited to two. Three or more diffraction grating parts may be formed through uniform-thickness layers which are arranged according to the invention as described above.

Figure 8:
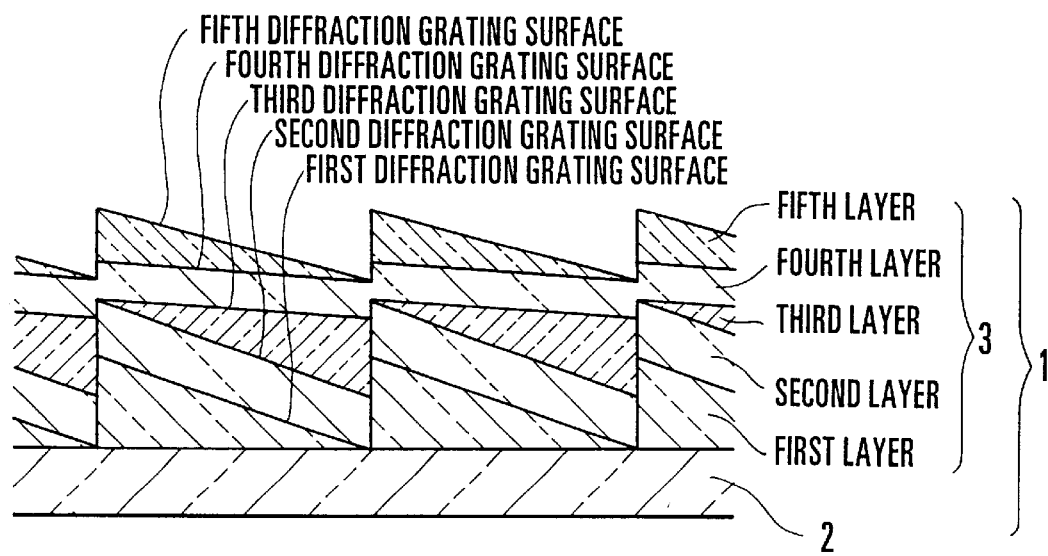
FIG. 8 is a sectional view showing essential parts of a diffractive optical element according to a third embodiment of the invention.

FIG. 8 shows in a sectional view a diffractive optical element having three diffraction gratings, according to a third embodiment of the invention. Referring to FIG. 8, counting from the layer located nearest to a base plate 2, these layers are laminated in the order of first, second, third, fourth and fifth layers. First to fifth diffraction grating surfaces are formed in the same order at respective boundaries between the layers. In this case, diffraction gratings are formed at the first, third and fifth layers. The second and fourth layers are formed as uniform-thickness layers which represent the feature of the invention. With these layers arranged in this manner, the shape of the diffraction grating surface formed between the first and second layers becomes the same as that of the diffraction grating surface formed between the second and third layers.

Generally, a diffractive optical element of a laminated-layer structure composed of an L-number of layers, a 2h-th layer is arranged to be a uniform-thickness layer to form a (2h−1)-th diffraction grating surface and a 2h-th diffraction grating surface in the same shape. In this case, there is obtained a relation of 2h≦L, where h represents a positive integer. Such arrangement gives the advantageous feature of the invention even to a diffractive optical element of a multi-layer structure.

Figure 9:
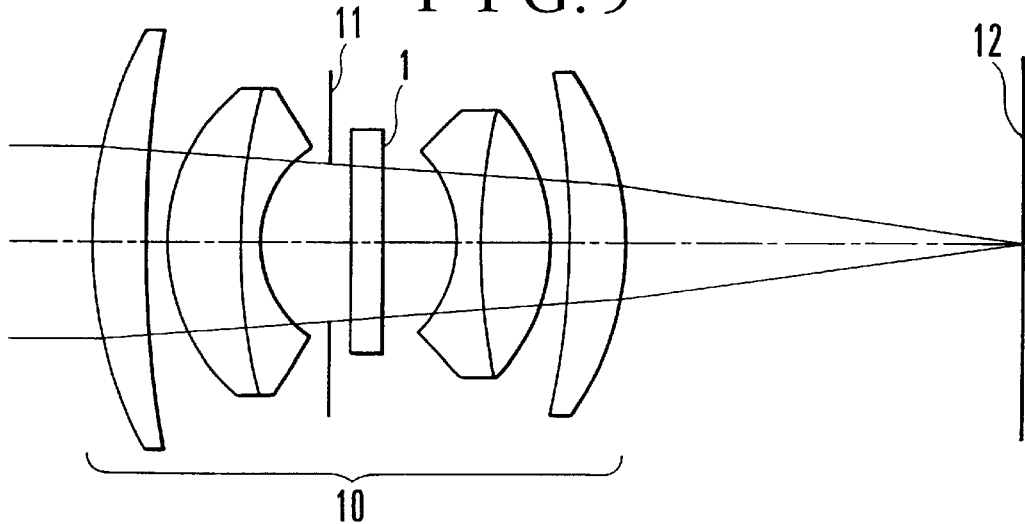
FIG. 9 schematically shows an optical system using a diffractive optical element according to a fourth embodiment of the invention.

A diffractive optical element according to a fourth embodiment of the invention is schematically shown in FIG. 9. FIG. 9 is a sectional view of a photo-taking optical system of a camera or the like. Referring to FIG. 9, a photo-taking lens 10 includes therein a diaphragm 11 and the diffractive optical element 1. An image forming plane 12 represents either a film or a CCD.

The use of the diffractive optical element which is composed of laminated layers greatly improves the wavelength dependency of diffraction efficiency. The photo-taking lens, therefore, can be arranged to have little flare light and a high degree of resolution at a low frequency to ensure a high performance. Further, since the diffractive optical element according to the invention can be simply manufactured, the photo-taking lens can be manufactured by mass production at a low cost.

In the case of FIG. 9, the diffractive optical element 1 is provided on the surface of a flat glass plate in the neighborhood of the diaphragm 11. However, the position of the diffractive optical element 1 is not limited to this position. The diffractive optical element 1 may be arranged on a curved lens surface. It is also possible to arrange a plurality of diffractive optical elements within the photo-taking lens.

The invention is applied to the photo-taking lens of a camera in the case of the fourth embodiment. However, the same advantageous effect is attainable by using the diffractive optical element according to the invention for a photo-taking lens of a video camera, an image scanner of a business machine, a reading lens of a digital copying machine, etc.

Figure 10:
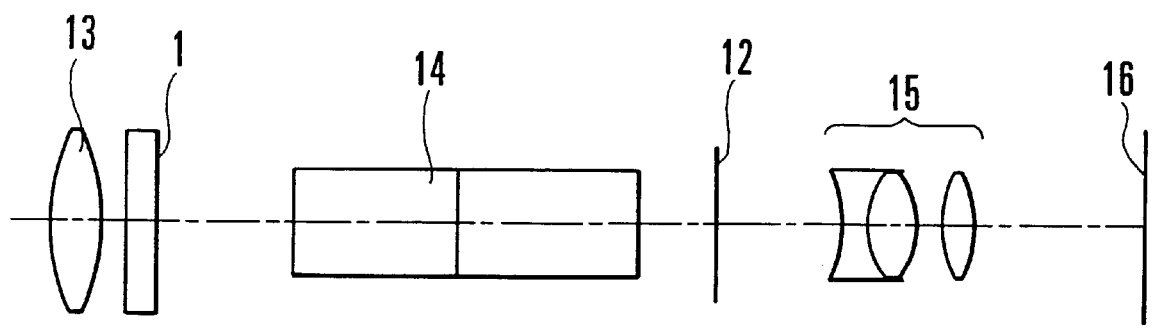
FIG. 10 schematically shows an optical system using a diffractive optical element according to a fifth embodiment of the invention.

FIG. 10 is a sectional view which schematically shows, as a fifth embodiment of the invention, an optical system using a diffractive optical element arranged according to the invention. The optical system shown in FIG. 10 is an observation optical system of a binocular or the like. The illustration of FIG. 10 includes an objective lens 13, the diffractive optical element 1, an image inverting prism 14, an eyepiece lens 15, and an evaluation surface (a pupil surface) 16.

The diffractive optical element 1 is provided for the purpose of correcting chromatic aberration or the like taking place on an image forming plane 12 of the objective lens 13.

The wavelength dependency of the diffraction efficiency of the fifth embodiment is greatly improved by the use of the diffractive optical element of the laminated structure. The objective lens which uses the diffractive optical element according to the invention, therefore, has little flare light and a high resolving power at a low frequency to ensure a high performance. Besides, the diffractive optical element can be simply manufactured. Therefore, the observation optical system according to the fifth embodiment of the invention facilitates mass production to lower the manufacturing cost thereof.

In the fifth embodiment, the diffractive optical element 1 is disposed in the neighborhood of the objective lens 13. The position of the diffractive optical element 1 is, however, not limited to this. The same advantageous effect is attainable, for example, by arranging the diffractive optical element 1 on the surface of the prism 14 or within the eyepiece lens 15. With the diffractive optical element 1 disposed on the object side of the image forming plane 12, it serves to abate chromatic aberration caused solely by the objective lens 13. Therefore, in the case of an observation system for observation with the unaided eye, it is preferable to have the diffractive optical element 1 set at least between the objective lens 13 and the image forming plane 12.

In the case of the fifth embodiment, the invention is applied to a binocular. However, the same advantageous effect of the fifth embodiment is attainable by applying the invention to a terrestrial or astronomical telescope or to an optical viewfinder of a lens-shutter type camera, a video camera, or the like.

According to the arrangement of each of the embodiments described above, the layers of the diffractive optical element formed by laminating two or more layers on a base plate are appositely arranged to attain a high degree of diffraction efficiency. The arrangement makes selection of materials for these layers easier to facilitate the manufacture. Besides, the diffractive optical element according to the invention is capable of retaining a high degree of diffraction efficiency and effectively suppressing the generation of flare light or the like.

The advantages mentioned above are attained, because a plurality of layers are laminated and joined together through a layer or layers having a uniform thickness in accordance with the invention, in such a manner that the layers of uniform thickness are arranged to have such optical characteristics that contribute to enhancement of the diffraction efficiency while the uniform-thickness layer or layers have such a characteristic that contributes to facilitation of manufacturing processes.

The use of the diffractive optical element for a photo-taking lens according to the invention enables the photo-taking lens to be manufactured at a low cost and to operate with a high degree of accuracy.

The use of the diffractive optical element for an observation optical system according to the invention enables the observation optical system to be manufactured at a low cost and to operate with a high degree of accuracy.

What is claimed is:

1. A diffractive optical element comprises three or more layers made of at least three kinds of materials wherein a plurality of diffraction grating surfaces are formed at interfaces between adjacent layers, wherein each even-number-th layer has a uniform thickness, and wherein the materials of first and third layers are different from each other in the dispersion, and for each of a plurality of different wavelengths, the optical-path-length difference generated between light beams having the wavelength passing said plurality of diffraction grating surfaces is an integral multiple of the wavelength.

2. A diffractive optical element according to claim 1, wherein the wavelength is $\lambda 0$, the refractive index of the second layer is $no2$, and the thickness of said second layer is $d2$, and the following is satisfied:

$$no2 \times d2 = \left(\frac{\lambda o}{4}\right).$$

3. A diffractive optical element comprises three or more layers made of at least three kinds of materials, wherein, where said three or more layers are counted in order as an I-th layer, a plurality of diffraction grating surfaces are formed such that a first diffraction grating surface which is formed at a boundary between the first layer and the second layer, a second diffraction grating surface which is formed at a boundary between the second layer and the third layer, up through an L-th diffraction grating surface which is formed at a boundary between the L-th layer and the (L+1)-th layer, and each even-number-th layer is a layer having a uniform thickness over an entire area thereof, and wherein the materials of first and third layers are different from each other in dispersion, and for each of a plurality of different wavelengths, the optical-path-length difference generated between light beams having the wavelength passing said plurality of diffraction grating surfaces is an integral multiple of the wavelength.

4. A diffractive optical element according to claim 3, wherein the thickness of the uniform-thickness layer is greater than the depth of a grating groove of a diffraction grating surface formed at a boundary between the uniform-thickness layer and an adjacent layer.

5. A diffractive optical element according to claim 3, wherein the uniform-thickness layer has such a thickness as to provide a reflection-preventing characteristic.

6. A diffractive optical element according to claim 3, wherein the uniform-thickness layer is made of a plastic optical material or an ultraviolet curable resin.

7. A diffractive optical element according to claim 3, wherein the useful wavelength region is a visible spectrum.

8. A diffractive optical element according to claim 3, wherein the first layer is formed on a base plate, and the first layer and the base plate are made of the same material.

9. An optical system using a diffractive optical element according to one of claims 1 and 2 to 8.

10. An optical system according to claim 9, wherein said optical system is an image forming optical system.

11. An optical system according to claim 9, wherein said optical system is an observation optical system.

12. An optical apparatus or an electronic apparatus having an optical system according to claim 9.

* * * * *

UNITED STATES PATENT AND TRADEMARK OFFICE
CERTIFICATE OF CORRECTION

PATENT NO. : 6,330,110 B2
DATED : December 11, 2001
INVENTOR(S) : Takehiko Nakai It is certified that error appears in the above-identified patent and that said Letters Patent is hereby corrected as shown below:

Column 6,
Line 11, "wave length" should read -- wavelength --.

Column 9,
Line 13, "Despite of" should read -- Despite --.

Column 12,
Line 45, "λo" should read -- λ0 --.

Column 14,
Line 5, "claims 1 and 2 to 8" should read -- claims 1 to 8 --.

Signed and Sealed this

Eighth Day of October, 2002

*Attest:*

JAMES E. ROGAN
*Attesting Officer*     *Director of the United States Patent and Trademark Office*